(12) United States Patent
Waltner et al.

(10) Patent No.: US 11,225,911 B2
(45) Date of Patent: Jan. 18, 2022

(54) TURBINE INTER-SPOOL ENERGY TRANSFER SYSTEM

(71) Applicant: Sikorsky Aircraft Corporation, Stratford, CT (US)

(72) Inventors: Peter James Waltner, Royal Palm Beach, FL (US); Tad Arthur Mondell, Jr., Palm Beach Gardens, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 864 days.

(21) Appl. No.: 15/223,210

(22) Filed: Jul. 29, 2016

(65) Prior Publication Data

US 2017/0058781 A1 Mar. 2, 2017

Related U.S. Application Data

(60) Provisional application No. 62/210,229, filed on Aug. 26, 2015.

(51) Int. Cl.
| | | |
|---|---|---|
| F02C 7/00 | (2006.01) | |
| F02C 7/36 | (2006.01) | |
| F02C 3/107 | (2006.01) | |
| F02C 3/113 | (2006.01) | |
| F02C 3/10 | (2006.01) | |

(52) U.S. Cl.
CPC ............ *F02C 7/36* (2013.01); *F02C 3/10* (2013.01); *F02C 3/107* (2013.01); *F02C 3/113* (2013.01); *F05D 2220/329* (2013.01); *F05D 2260/40311* (2013.01); *F05D 2270/20* (2013.01)

(58) Field of Classification Search
CPC .... F02C 7/36; F02C 7/32; F02C 3/107; F02C 3/113; F02C 6/14; F05D 2260/40311; F05D 2270/20; F05D 2220/60; B60K 6/28
See application file for complete search history.

(56) References Cited

U.S. PATENT DOCUMENTS

| | | | | |
|---|---|---|---|---|
| 2013/0247539 | A1* | 9/2013 | Hoppe | F02C 7/32 60/39.15 |
| 2014/0150401 | A1* | 6/2014 | Venter | F02C 7/36 60/39.45 |
| 2014/0360205 | A1* | 12/2014 | French | F01D 15/10 60/786 |

OTHER PUBLICATIONS

Website: URL:<https://en.wikipedia.org/wiki/File:Turboshaft_operation.png>, Retrieve on Jun. 27, 2016, 5 pages.

* cited by examiner

*Primary Examiner* — Edwin Kang
(74) *Attorney, Agent, or Firm* — Foley & Lardner LLP

(57) ABSTRACT

An inter-spool energy transfer system is provided and includes a first spool, a second spool, which includes components that are rotatable at a different speed as compared to components of the first spool and an inter-spool interface system coupled to at least one of the components of the first spool and at least one of the components of the second spool. The inter-spool interface system includes a controller, which is configured to supply power to one of the first and second spools and to draw power from the other of the first and second spools.

13 Claims, 5 Drawing Sheets

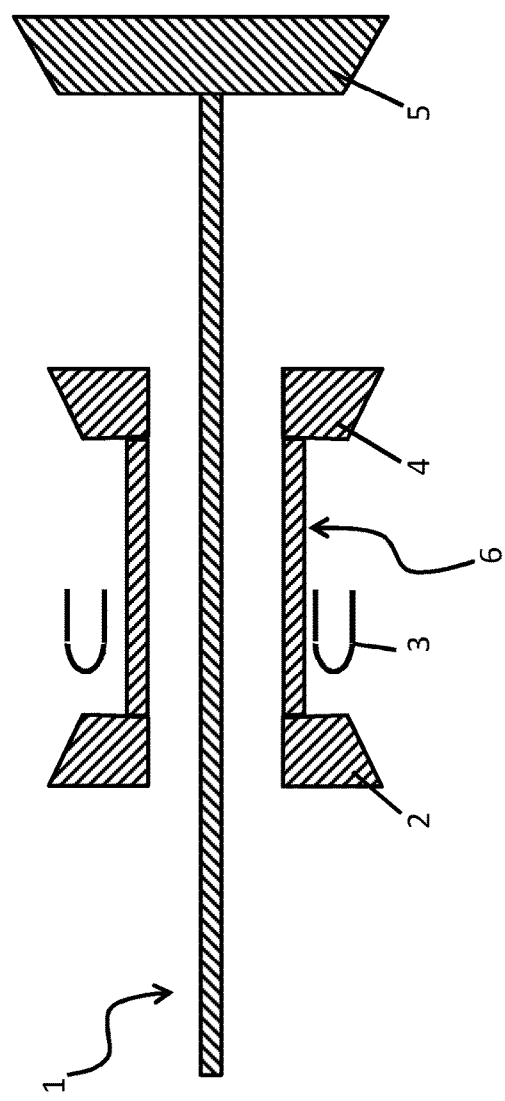
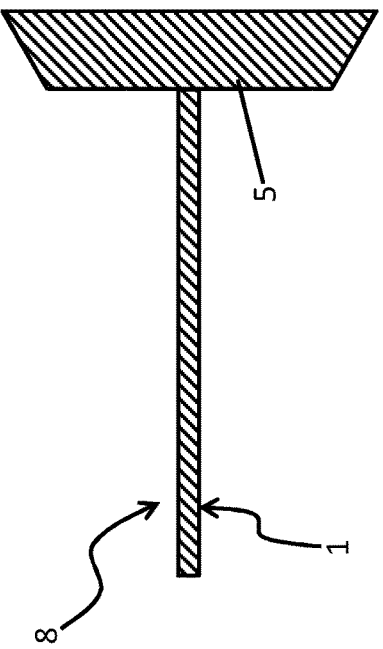
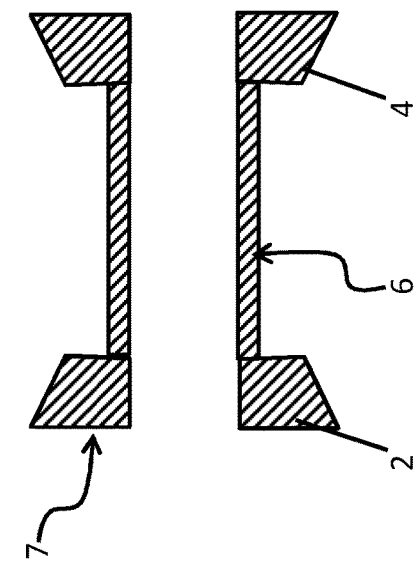

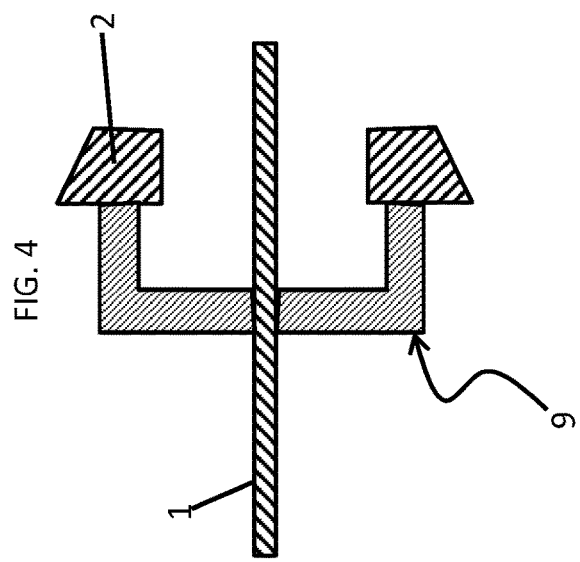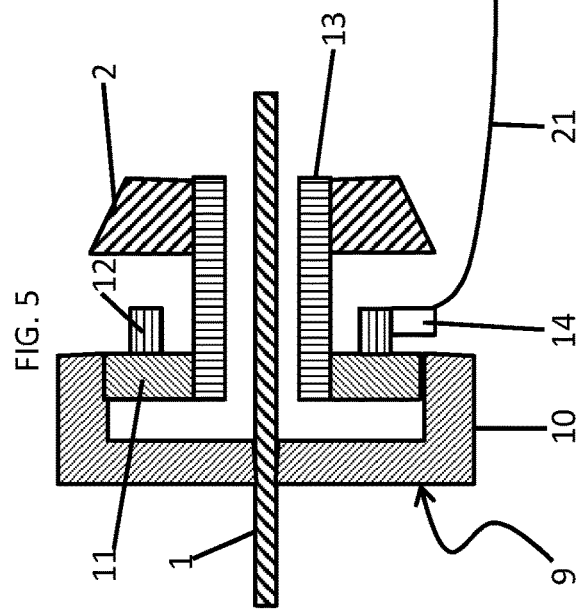

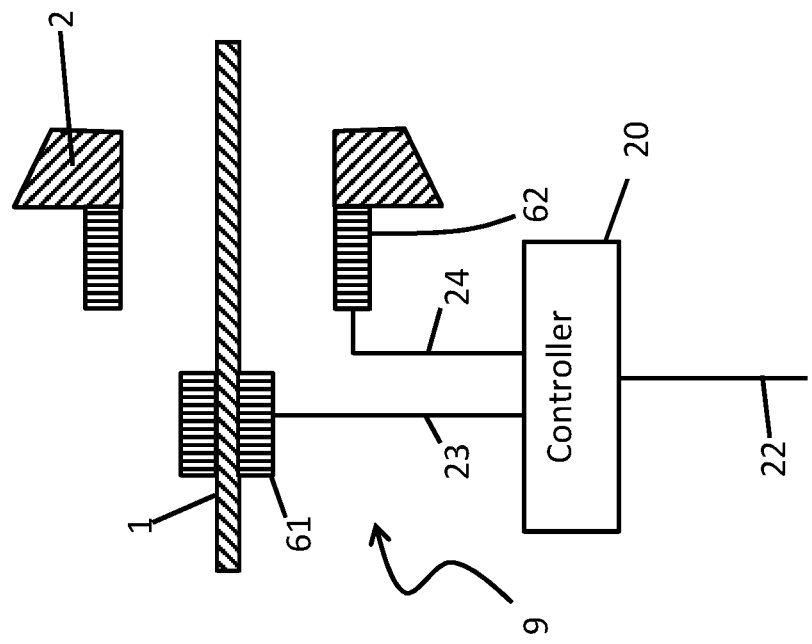

TURBINE INTER-SPOOL ENERGY TRANSFER SYSTEM

CROSS-REFERENCE TO RELATED APPLICATIONS

This application claims benefit of priority of U.S. Provisional Application No. 62/210,229 filed on Aug. 26, 2015, the disclosure of which is incorporated by reference.

BACKGROUND OF THE DISCLOSURE

The subject matter disclosed herein relates to an energy transfer system and, more particularly, to a turbine inter-spool energy transfer system.

For multi-spool engines, whether those engines are provided in vehicles, aircraft or ground-based systems, the engines generally include a power shaft, a compressor or "gas generator", a combustor, a gas generator turbine, a power turbine and a compressor shaft. During operation, inlet air is compressed in the gas generator to produce compressed air. This compressed air is then mixed with fuel and combusted in the combustor to produce a working fluid. The working fluid is directed to the gas generator turbine in which the working fluid is expanded to generate power that is used to drive rotations of the compressor shaft. Such rotations drive, for example, inlet air compression operations of the gas generator. The working fluid is then transmitted to the power turbine in which the working fluid is expanded further to generate additional power that is used to drive rotations of the power shaft in order to power gearboxes, fans, or other aircraft systems.

For such engines, an operational problem exists in that it is often the case that engine power will be limited by one parameter (e.g. speed or temperature) while having margin with respect to other parameters. As such, there exists untapped potential for increasing engine power without increases to speed or temperature limits of the engine.

BRIEF DESCRIPTION OF THE DISCLOSURE

According to one aspect of the disclosure, an inter-spool energy transfer system is provided and includes a first spool, a second spool, which includes components that are rotatable at a different speed as compared to components of the first spool and an inter-spool interface system coupled to at least one of the components of the first spool and at least one of the components of the second spool. The inter-spool interface system includes a controller, which is configured to supply power to one of the first and second spools and to draw power from the other of the first and second spools.

In accordance with additional or alternative embodiments, a power connection is provided between the controller and one or more of the aircraft electrical systems, hydraulic systems, compressed air systems, and mechanical systems.

In accordance with additional or alternative embodiments, the first spool is a core spool including a gas generator, a gas generator turbine and a compressor shaft and the second spool is a power spool including a power shaft and a power turbine.

According to one aspect of the disclosure, an inter-spool energy transfer system is provided for use in a vehicle including an electrical system. The system includes a first spool, a second spool, which includes components that are rotatable at a lesser speed as compared to components of the first spool and an inter-spool interface system coupled to at least one of the components of the first spool and at least one of the components of the second spool. The inter-spool interface system includes a controller configured to supply power to the electrical system by transferring torque from the first spool to the second spool and draw power from the electrical system by transferring torque from the second spool to the first spool.

In accordance with additional or alternative embodiments, a power connection is provided between the controller and the electrical system.

In accordance with additional or alternative embodiments, the first spool is a core spool including a gas generator, a gas generator turbine and a compressor shaft and the second spool is a power spool including a power shaft and a power turbine.

In accordance with additional or alternative embodiments, the inter-spool interface system is coupled to the power shaft and the gas generator.

In accordance with additional or alternative embodiments, the inter-spool interface system includes a planetary gear system.

In accordance with additional or alternative embodiments, the inter-spool interface system includes an electrical interface.

In accordance with additional or alternative embodiments, the inter-spool interface system includes a torque converter and the torque converter includes one or more of a mechanical, fluidic, fluid-mechanical, electro-mechanical, pneumatic and electronic torque converter.

In accordance with additional or alternative embodiments, the inter-spool energy transfer system is coupled to the power spool.

In accordance with additional or alternative embodiments, energy is transferred from the first spool to the second spool in order to increase available power without increasing first spool speed and energy is transferred from the second spool to the first spool in order to increase available power without increasing engine temperature.

In accordance with additional or alternative embodiments, energy is transferred from the first spool to the second spool or from the second spool to the first spool in order to control engine efficiency.

In accordance with additional or alternative embodiments, energy is transferred from the first spool to the second spool or from the second spool to the first spool in order to increase engine power response rate.

In accordance with additional or alternative embodiments, a transfer of power is initiated and initially maintained in anticipation of a transient power demand with power transfer being subsequently reduced to increase a power response rate for power demands.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a schematic illustration of a turbo-shaft power plant in accordance with embodiments;

FIG. 2 is a schematic illustration of components of the turbo-shaft power plant of FIG. 1 that form a core spool;

FIG. 3 is a schematic illustration of components of the turbo-shaft power plant of FIG. 1 that form a power spool;

FIG. 4 is a generalized schematic illustration of an inter-spool interface system in accordance with embodiments;

FIG. 5 is a schematic illustration of a planetary gear embodiment of the inter-spool interface system of FIG. 4;

FIG. 6 is a schematic illustration of an electrical interface embodiment of the inter-spool interface system of FIG. 4;

Figure 7:
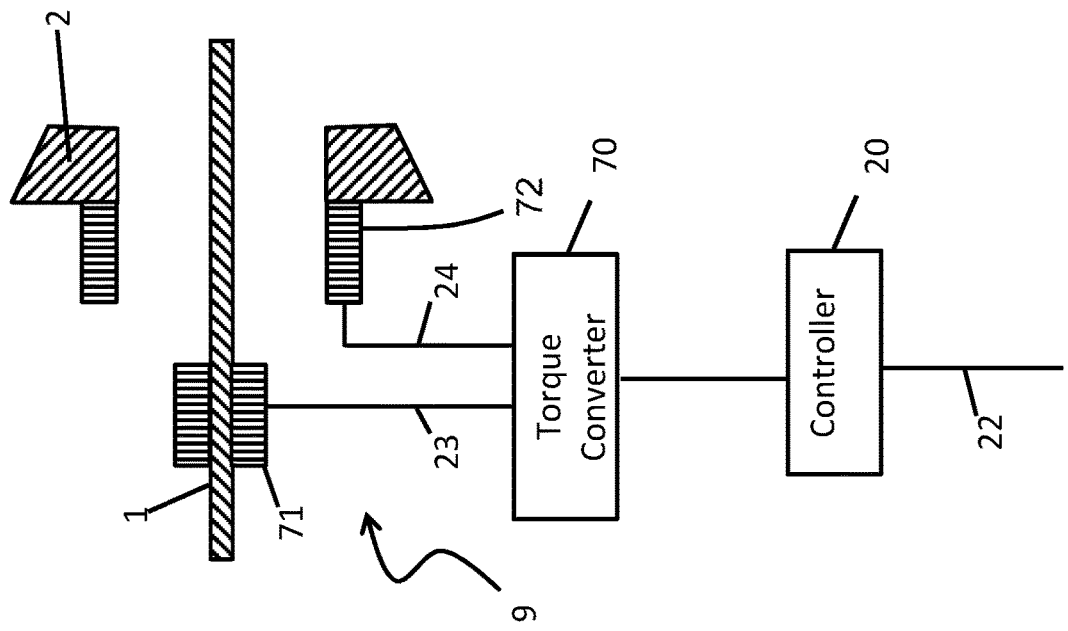
FIG. 7 is a schematic illustration of a torque converter embodiment of the inter-spool interface system of FIG. 4.

The detailed description explains embodiments of the disclosure, together with advantages and features, by way of example with reference to the drawings.

DETAILED DESCRIPTION OF THE DISCLOSURE

As will be described below, an inter-spool energy transfer system is provided for use with multi-spool engines to transfer energy between turbine stages in order to optimize overall engine performance (i.e., power, thrust, operating characteristics, etc.). The inter-spool energy transfer system may be usable for optimization of turbine performance for fixed wing (fan, prop, jet), rotary wing, ground vehicles (tanks, trains), electric power stations and/or any other end use which uses (primarily) multi-spool turbines. The inter-spool energy transfer system can make use of core load to slow down a free turbine (i.e., a gas generator turbine spool in a turbo-shaft engine) when the free turbine reaches its speed limit. This allows additional fuel to be added to the turbine until the engine produces more power and simultaneously operates at speed and temperature limits.

Alternatively, when the engine reaches its temperature limit with free turbine speed margin (i.e., a gas generator speed margin), the inter-spool energy transfer system can use aircraft or engine power to spin-up the free turbine to increase mass-flow and increase pressure/thermodynamic efficiency. This allows more fuel to be added and thus more power to be extracted when the engine would otherwise be operating on a T45 limit. Meanwhile, when the engine is operating in a low power mode, power may be transferred from the power spool to the free turbine to increase the free turbine speed such that the engine power response to a quick increase in power may be improved. Additionally, energy may be transferred between the power spool and the free turbine in order to control the engine to be either more or less efficient. Also, the inter-spool energy transfer system may be used to inject energy into the engine from aircraft electric, hydraulic or compressed air power systems or to extract energy out of the engine to power these aircraft systems.

With reference to FIG. 1, an engine of a vehicle such as an aircraft or a helicopter is provided. The engine includes a power shaft 1, a compressor or "gas generator" 2, a combustor 3, a gas generator turbine 4, a power turbine 5 and a compressor shaft 6. During operation of the engine, inlet air is compressed in the gas generator 2 to produce compressed air. This compressed air is then mixed with fuel and combusted in the combustor 3 to produce a working fluid. The working fluid is directed to the gas generator turbine 4 in which the working fluid is expanded to generate power that is used to drive rotations of the compressor shaft 6. Such rotations drive, for example, inlet air compression operations of the gas generator 2. The working fluid is then transmitted to the power turbine 5 in which the working fluid is expanded further to generate additional power that is used to drive rotations of the power shaft 1.

Although the engine described above is similar to a turbo-shaft engine, the description provided herein is not limited to any particular engine configuration. Indeed, the description provided herein may be applicable to any multi-spool turbine engine such as, but is not limited to, turbo-shaft engines, turbo-jets, turbo-fans, turbo-prop aircraft, turbo-shaft helicopters, 3+ spool turbines and ground-based power turbines.

With reference to FIGS. 2-4, it will be understood that the gas generator 2, the gas generator turbine 4 and the compressor shaft 6 combine to form a core spool 7 (see FIG. 2) and that the power shaft 1 and the power turbine 5 combine to form a power spool 8 (see FIG. 3). As shown in FIG. 4, an inter-spool interface system 9 may be provided with a first end coupled to the power shaft 1 and a second end opposite the first end coupled to a compressor or front portion of the gas generator 2.

With reference to FIG. 5 and, in accordance with embodiments, the inter-spool interface system 9 may be provided as a planetary gear system that connects the power shaft 1 to the compressor or front portion of the gas generator 2. That is, as shown in FIG. 5, the inter-spool interface system 9 may include a ring gear 10, a planet gear 11, a planet carrier 12 and a sun gear 13. The ring gear 10 is coupled to the power shaft 1 and the sun gear 13 is coupled to the compressor or front portion of the gas generator 2. The planet gear 11 is integrally connected to and supported by the planet carrier 12 and is interposed between the ring gear 10 and the sun gear 13. The inter-spool interface system 9 further includes a planet carrier drive system 14, a controller 20, a power line 21 and power and control connection 22. The controller 20 is electrically powered by way of and accepts commands from the power and control connection 22 and is capable of providing power to or extracting power from planet carrier drive system 14 by way of power line 21.

In the embodiment of FIG. 5, the planetary gear system can be used to couple the core spool 7 and the power spool 8 together so as to provide power to or draw power from the carrier drive system 14 and to thereby transfer power between the core spool 7 and the power spool 8 as an electronic torque converter. The power input/draw is controlled by the controller 20 (which is most likely an electronic controller but could be generalized to controlling electric, mechanical, pneumatic or fluidic power supply to the planet carrier 12 in order to affect torque transfer) and the power and control connection 22 connects to the aircraft systems. The power and control functions of the power and control connection 22 may be formed of multiple lines but is depicted in FIG. 5 as one line for ease of illustration.

When the controller 20 is supplying power to the power and control connection 22, the supply of power can be used to power electrical systems of the aircraft and thereby reduce power draws by other generators as applicable as in a case of a hybrid engine powered helicopter, for example. The supply of power can also be used to charge batteries or be wasted. In any case, when the controller 20 is supplying power to the power and control connection 22, since the gas generator 2 usually spins faster than the power shaft 1, the inter-spool interface system 9 will be transferring torque from the gas generator 2 to the power shaft 1 while at the same time supplying electrical power out on the power and control connection 22. The controller 20 can thus make use of core spool 7 loading to slow down the gas generator 2 and to thereby allow additional fuel to be added to the gas generator 2 so that the gas generator 2 can generate more power until the engine reaches a state where it is simultaneously operating at speed and temperature limits.

Conversely, when the controller 20 is drawing power from the power and control connection 22, the supply of power may be drawn from generators elsewhere in the aircraft power system and, in any case, since the gas generator 2 is usually spinning faster than the power shaft 1, the inter-spool interface system 9 will be transferring torque from the power shaft 1 to the gas generator 2. In this case, electrical power can be used by the controller 20 to spin-up the gas generator 2 to increase mass-flow and to increase pressure/thermodynamic efficiency and to thereby allow more power to be extracted from the power spool 8 while adjusting fuel to maintain the engine at the temperature limit.

Similarly, when the engine is operating in a low power state, the controller 20 may command an increase gas generator 2 operating speed to maintain a higher speed than thermodynamic equilibrium would otherwise dictate as discussed above. With the core spool 7 operating at a higher speed, the core would not need to accelerate as far in order to enable the engine to produce the desired power and the power required to maintain the gas generator 2 operating speed at a higher than thermodynamic equilibrium may be progressively shed as the gas generator 2 accelerates. The combination of these two actions will result in a faster net power delivery response than would otherwise be possible to be provided by the engine without the inter-spool interface system 9. Additionally, when a transient drop in engine power is commanded, the controller 20 may maintain the engine gas generator 2 speed at a high speed such that subsequent demands for increased power may be accomplished at a fast rate. Also, when in a low power state (i.e., not on an engine limit), the controller 20 may control transfer of power between the core spool 7 and the power spool 8 in order to control and either increase or decrease the efficiency of the engine.

With reference to FIG. 6 and, in accordance with alternative embodiments, the inter-spool interface system 9 may be provided as an electrical interface. Here, the controller 20 drives rotations of the power shaft 1 by transmitting electrical power to a first motor-generator 61 by way of first power line 23. Conversely, the controller 20 receives from the first motor-generator 61, by way of the first power line 23, electrical power generated by the first motor-generator 61 from rotations of the power shaft 1 (i.e., the power spool 8). In addition, the controller 20 drives operations of the gas generator 2 by transmitting electrical power to a second motor-generator 62 by way of second power line 24. Conversely, the controller 20 receives from the second motor-generator 62, by way of the second power line 24, electrical power generated by the second motor-generator 62 from operations of the gas generator 2 (i.e., the core spool 7). As such, the controller 20 may control the flow of electrical power between the first and second motor-generators 61 and 62 and thus transfer energy between the core spool 7 and power spool 8.

In accordance with further embodiments, the controller 20 may be connected to aircraft systems via the power and control connection 22 where the controller 20 may extract a net electrical power from one or more of the first and second power lines 23 and 24 to power aircraft systems via the power and control connection 22. Additionally, the controller 20 may receive power via the power and control connection 22 in order to drive one or more of first and second motor-generators 61 and 62.

With reference to FIG. 7 and, in accordance with alternative embodiments, the inter-spool interface system 9 may be provided as a generalized torque converter system. Here, the controller 20 controls torque converter 70 to drive rotations of the power shaft 1 by transmitting power to a power shaft accessory gearbox 71 by way of first power line 23 and torque-converter 70. Conversely, the torque converter 70 may receive power from the power shaft accessory gearbox 71 by way of the first power line 23. In addition, the controller 20 controls torque converter 70 to drive operations of the gas generator 2 by transmitting power to a core spool accessory gearbox 72 by way of second power line 24 and the torque converter 70. Conversely, the torque converter 70 may receive power from the core spool accessory gearbox 72 by way of the second power line 24. As such, the controller 20 may command the torque converter 70 to transfer torque and power between the core spool 7 and the power spool 8.

In accordance with further embodiments, the controller 20 may be connected to aircraft systems via the power and control connection 22 where the controller 20 may extract torque or power from torque converter 70 via one or more of the first and second power lines 23 and 24 to power aircraft systems via the power and control connection 22. Additionally, the controller 20 may receive power via the power and control connection 22 in order to drive one or more of power shaft accessory gearbox 71 and core spool accessory gearbox 72 via the first and second power lines 23 and 24 and torque converter 70.

Figure 8:
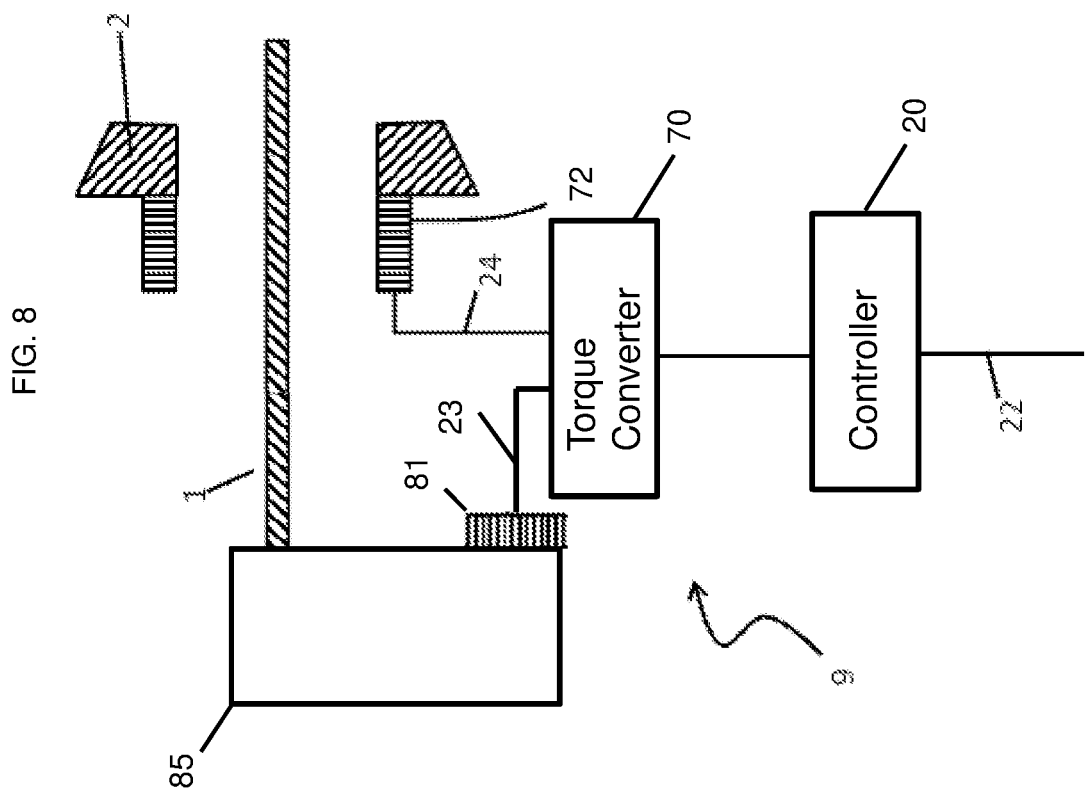
FIG. 8 is a schematic illustration of a generalized inter-spool interface system in accordance with embodiments.

With reference to FIG. 8 and with continuing reference to FIG. 7, the inter-spool interface system 9 may be generalized such that the torque converter 70 interface with the power spool 8 and the power shaft 1 may connect indirectly through an aircraft drivetrain accessory gearbox 81. This aircraft drivetrain accessory gearbox 81 may incorporate a mechanical drive system 85 connected to the turbine engine. In this configuration, power is transferred directly between aircraft drivetrain accessory gearbox 81 and core spool accessory gearbox 72 via torque converter 70. Under certain embodiments, the first power line 23 may provide the power functions of the power and control line 22.

With reference to FIGS. 4-8, any number of over-run clutches and clutch engagement systems and associated control systems may be utilized at the interface of the inter-spool interface system 9 with the core spool 7 and the power spool 8 in order to engage or disengage the inter-spool interface system 9 with/from the core spool 7 and the power spool 8. These clutches have been excluded from the figures and discussion for clarity.

For brevity and clarity, the disclosure herein described an engine with two spools (i.e., a turbine engine with a core spool 7 and a power spool 8). The core spool 7 and power spool 8 may be generalized to be a first spool and second spool of the engine. Additionally, in general, this first and second spool may represent any two selected spools for turbine engines incorporating more than two spools.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An inter-spool energy transfer system, comprising:
a first spool;
a second spool, which includes components that are rotatable at a different speed as compared to components of the first spool;
a compressed air system connected to the first spool;
a mechanical drive system connected to the second spool; and
an inter-spool interface system comprising a planetary gear system coupled to at least one of the components of the first spool and at least one of the components of the second spool,
wherein the planetary gear system includes a sun gear disposed to contact the first spool, a ring gear disposed to contact the second spool, and a planet gear operatively connecting the ring gear and the sun gear,
wherein the inter-spool interface system comprises:
a controller, which is configured to control supplying and drawing power to and from a planet carrier, wherein the planet carrier is configured to transfer energy between the first and second spools, and
wherein the controller is further configured to control transferring the energy, via the planet carrier, from the first spool to the second spool or from the second spool to the first spool through the inter-spool interface system.

2. The inter-spool energy transfer system according to claim 1, further comprising a power connection between the controller and an aircraft electrical system.

3. The inter-spool energy transfer system according to claim 1, wherein:
the first spool is a core spool connected to the compressed air system, which comprises a gas generator, a gas generator turbine, and a compressor shaft; and
the second spool is a power spool connected to the mechanical drive system, which comprises a power shaft and a power turbine.

4. The system according to claim 1, wherein the planet carrier is driven by a planet carrier drive system coupled to the planet carrier.

5. The system according to claim 1, wherein the controller is further configured to control thermodynamic efficiency of the inter-spool interface system by controlling an amount of torque transferred, via the planet carrier, from the second spool to the first spool.

6. The system according to claim 1, wherein the controller is configured to increase a speed of the first spool relative to the second spool during a first power state.

7. An inter-spool energy transfer system for use in a vehicle including an electrical system, comprising:
a first spool;
a second spool, which includes components that are rotatable at a lesser speed as compared to components of the first spool;
a compressed air system connected to the first spool;
a mechanical drive system connected to the second spool; and
an inter-spool interface system comprising a planetary gear system coupled to at least one of the components of the first spool and at least one of the components of the second spool,
wherein the planetary gear system includes a sun gear disposed to contact the first spool, a ring gear disposed to contact the second spool, and a planet gear operatively connecting the ring gear and the sun gear
wherein the inter-spool interface system comprises a controller configured to:
control supplying power to the electrical system by transferring torque, via a planet carrier, from the first spool to the second spool,
control drawing power from the electrical system by transferring torque, via the planet carrier, from the second spool to the first spool, and
control transferring power from the first spool to the second spool or from the second spool to the first spool through the inter-spool interface system.

8. The inter-spool energy transfer system according to claim 7, further comprising a power connection between the controller and the electrical system.

9. The inter-spool energy transfer system according to claim 7, wherein the first spool is a core spool comprising a gas generator, a gas generator turbine and a compressor shaft and the second spool is a power spool comprising a power shaft and a power turbine.

10. The inter-spool energy transfer system according to claim 9, wherein the inter-spool interface system is coupled to the power shaft and the gas generator.

11. A method of controlling an inter-spool energy transfer system, the inter-spool energy transfer system comprising:
a first spool;
a second spool, which includes components that are rotatable at a lesser speed as compared to components of the first spool;
a compressed air system connected to the first spool;
a mechanical drive system connected to the second spool; and
an inter-spool interface system comprising a planetary gear system coupled to at least one of the components of the first spool and at least one of the components of the second spool,
wherein the planetary gear system includes a sun gear disposed to contact the first spool, a ring gear disposed to contact the second spool, and a planet gear operatively connecting the ring gear and the sun gear,
wherein the inter-spool interface system comprises a controller configured to:
control supplying power to the electrical system by transferring torque, via a planet carrier, from the first spool to the second spool,
control drawing power from the electrical system by transferring torque, via the planet carrier, from the second spool to the first spool, and
control transferring power from the first spool to the second spool or from the second spool to the first spool through the inter-spool interface system,
wherein transferring the torque from the first spool to the second spool includes transferring energy from the first spool to the second spool in order to increase available power without increasing first spool speed, and
wherein transferring the torque from the second spool to the first spool includes transferring energy from the second spool to the first spool in order to increase available power without increasing an engine temperature.

12. The method of controlling the inter-spool energy transfer system according to claim 11, wherein:
transferring the torque from the first spool to the second spool, and transferring the torque from the second spool to the first spool includes transferring the energy from the first spool to the second spool or from the second spool to the first spool in order to control an engine efficiency.

13. The method of controlling the inter-spool energy transfer system according to claim 11, wherein the energy is transferred from the first spool to the second spool or from the second spool to the first spool in order to increase an engine power response rate.

* * * * *